United States Patent [19]

Murano et al.

[11] Patent Number: 5,024,310
[45] Date of Patent: Jun. 18, 1991

[54] CLUTCH PRESSURE CONTROL DEVICE FOR CONTINUOUSLY VARIABLE TRANSMISSION

[75] Inventors: Katsuaki Murano; Yoshinori Yamashita; Sadayuki Hirano, all of Shizuoka; Takumi Tatsumi; Hiroaki Yamamoto, both of Hyogo, all of Japan

[73] Assignees: Suzuki Jidosha Kogyo Kabushiki Kaisha, Shizuoka; Mitsubishi Denki Kabushiki Kaisha, Tokyo, both of Japan

[21] Appl. No.: 443,712

[22] Filed: Nov. 29, 1989

[30] Foreign Application Priority Data

Nov. 30, 1988 [JP] Japan ............... 63-302729

[51] Int. Cl.⁵ .................. F16D 25/14; B60K 41/02
[52] U.S. Cl. ..................... 192/0.076; 192/109 F
[58] Field of Search ............. 192/3.58, 0.052, 0.076, 192/109 F

[56] References Cited

U.S. PATENT DOCUMENTS

| | | | |
|---|---|---|---|
| 4,458,318 | 7/1984 | Smit | 364/424.1 |
| 4,475,416 | 10/1984 | Underwood | 74/868 |
| 4,487,303 | 12/1984 | Boueri et al. | 192/3.58 X |
| 4,718,308 | 1/1988 | Haley | 74/866 |

FOREIGN PATENT DOCUMENTS

| | | |
|---|---|---|
| 57-186656 | 11/1982 | Japan . |
| 59-43249 | 3/1984 | Japan . |
| 59-77159 | 5/1984 | Japan . |
| 61-233256 | 10/1986 | Japan . |

*Primary Examiner*—Rodney H. Bonck
*Attorney, Agent, or Firm*—Flynn, Thiel, Boutell & Tanis

[57] ABSTRACT

A continuously variable transmission has a fixed pulley piece and a movable pulley piece supported on the fixed pulley piece so that the movable pulley piece can be moved toward and away from the fixed pulley piece, the width of a groove between the pieces being increased or decreased by changing hydraulic pressure so that the rotational radius of a belt looped around the pulleys is increased or decreased to vary a belt ratio. A clutch pressure control device includes a hydraulic clutch for which engagement and disengagement is controlled according to various control modes, and a control arrangement which calculates a target clutch pressure with reference to a slip amount of the hydraulic clutch and which feedback controls the target clutch pressure so that the slip amount of the clutch is maintained substantially constant.

11 Claims, 5 Drawing Sheets

FIG. 5

| Control mode | State of hydraulic clutch |
|---|---|
| (1) Neutral mode | Clutch pressure = 0, and clutch is off |
| (2) Hold mode | Clutch pressure = 3.5 to 4.0kg/cm$^2$, and half-clutch (creep state) |
| (3) Normal start mode | Clutch pressure = 5.0 to 15kg/cm$^2$, and engine torque is transmitted to wheel |
| (4) Special start mode | Clutch pressure = 5.0 to 15kg/cm$^2$, and engine torque is transmitted to wheel |
| (5) Coast mode | Clutch slip amount ≒ 50rpm, and rotation of input side of clutch and rotation of output side thereof are in synchronism with each other |
| (6) Drive mode | Clutch locked-up state, or after shifted from start mode, clutch is almost locked up |

CLUTCH PRESSURE CONTROL DEVICE FOR CONTINUOUSLY VARIABLE TRANSMISSION

FIELD OF THE INVENTION

This invention relates to a clutch pressure control arrangement for a continuously variable transmission and, more particularly, to a clutch pressure control arrangement for a continuously variable transmission where clutch pressure is electronically controlled in accord with a driving state of a vehicle and a clutch slip amount defined as a difference of rotational speeds between an input shaft and an output shaft of the clutch is maintained constant so that engine braking works well when the vehicle is coasting at a low speed, so that accelerating performance is enhanced when the vehicle is required to be accelerated, and so that a satisfactory driving feeling is obtained.

BACKGROUND OF THE INVENTION

In a vehicle, a transmission is interposed between an internal combustion engine and a driving wheel. This transmission changes the driving power provided to the driving wheel and the traveling speed in accordance with traveling conditions which are widely changed, so that the internal combustion engine can exhibit excellent performance. As an example of one kind of such transmission, there is a continuously variable transmission in which a transmission gear ratio (belt ratio) for transmitting power is changed by increasing and decreasing a rotational radius of a belt looped around a pulley having a fixed pulley piece fixed to a rotational shaft and a movable pulley piece movably supported on the rotational shaft so that the movable pulley piece can be moved toward and away from the fixed pulley piece to increase and decrease the width of a groove formed between the two pulleys by means of variations in hydraulic oil pressure. Such a continuously variable transmission is disclosed, for example, in Japanese Patent Early Laid-open Publication No. Sho 57-186656, Japanese Patent Early Laid-open Publication No. Sho 59-43249, Japanese Patent Early Laid-open Publication No. Sho 59-77159 and Japanese Patent Early Laid-open Publication No. Sho 61-233256.

Also, as such a continuously transmission, there is one which has a single plate type hydraulic clutch and selectively supplies power under hydraulic oil pressure control. This single plate type hydraulic clutch is controlled in various control modes in accord with a signal representing an engine speed, such as an opening degree of a throttle valve of a carburetor or the like.

In a conventional clutch pressure control device for a hydraulic clutch, there is a method for controlling clutch pressure to a target clutch pressure determined by an engine speed in a hold state of a half-clutch state, a method for controlling pressure to realize a target number of rotations determined by a throttle opening degree obtained by stepping on an accelerating pedal in a start mode, and a method for gradually increasing clutch pressure in accord with passage of time or determining clutch pressure as a minimum or maximum.

However, the hydraulic clutch is normally locked up when a vehicle is coasting at a medium or low speed where an accelerating pedal is not significantly pressed, that is, where a throttle opening degree is almost zero and a condition of traveling speed less than 5 km/hr is satisfied. Therefore, there arises an inconvenience in that, when the accelerating pedal is stepped on at that time, the engine torque generated is directly transmitted to the transmission and a vehicle body and gives vibrations or a shock to passengers.

Also, when accelerating from a reduced speed or a very low speed traveling when the hydraulic clutch is locked up, the engine speed is restrained immediately after the accelerating pedal is stepped on. As a result, an acceleration response is delayed and the state of the clutch is radically changed to generate a great shock. Consequently, the driving feeling is badly spoiled.

It is therefore an object of the present invention to realize a clutch pressure control in which, in order to eliminate the above-mentioned inconveniences, an engine braking works well while a vehicle is coasting at a medium or low speed by calculating a target clutch pressure with reference to a slip amount of a hydraulic clutch and feed-back controlling the target pressure so that the slip amount of the clutch is maintained substantially constant. When accelerating, a response to acceleration is enhanced to improve acceleration performance, and a radical change of the state of the clutch is prevented to improve the driving feeling.

SUMMARY OF THE INVENTION

In order to achieve the above-mentioned object, the present invention provides a clutch pressure control device for a continuously variable transmission having a fixed pulley piece and a movable pulley piece supported on the fixed pulley piece so that the movable pulley piece can be moved toward and away from the fixed pulley piece, the width of a groove between the pieces being increased or decreased by changing hydraulic pressure so that the rotational radius of a belt looped around the pulleys is increased or decreased to vary a belt ratio, the clutch pressure control device including a hydraulic clutch for which engagement and disengagement is controlled according to various control modes, and a control arrangement for calculating a target clutch pressure with reference to a slip amount of the hydraulic clutch and feed-back controlling the target clutch pressure so that the slip amount of the clutch is maintained substantially constant.

According to the present invention, the control arrangement calculates a target clutch pressure with reference to a slip amount of the hydraulic clutch and feed-back controls the target pressure so that the slip amount of the clutch is maintained substantially constant. By this, since the slip amount of the clutch can be maintained substantially constant, the hydraulic clutch achieves a generally synchronous state during a coasting operation at medium and low speeds and thus the engine braking works well. Moreover, engine speed is increased when accelerating and a response to acceleration is enhanced to improve acceleration performance, and a radical change of the state of the clutch is prevented from occurring. Thus, a driving feeling is improved.

BRIEF DESCRIPTION OF THE DRAWINGS

A preferred embodiment of the present invention will be described in detail with reference to the accompanying drawing, in which:

FIG. 5 is a table showing the state of the clutch in each of six modes.

FIGS. 1 through 4 show a preferred embodiment of the present invention. In FIG. 1, reference numeral 2 denotes a continuously variable transmission, 4 denotes a drive belt, 6 denotes a driving side pulley, 8 denotes a driving side fixed pulley piece, 10 denotes a driving side movable pulley piece, 12 denotes a driven side pulley, 14 denotes a driven side fixed pulley piece, and 16 denotes a driven side movable pulley piece. The driving side pulley 6, as shown in FIG. 1, includes a driving side fixed pulley piece 10 fixed to a rotational shaft 18 which is rotated by a prime mover such as an engine, and a driving side movable pulley 12 mounted on the rotational shaft 18 in a manner so that the pulley 12 can move in the axial direction relative to the rotational shaft 18 but is incapable of rotation. Also, the driven side pulley 12 is of the same construction as the driving side pulley 6. The driven side pulley 12 includes a driven side fixed pulley piece 14 and a driven side movable pulley 16.

Figure 1:
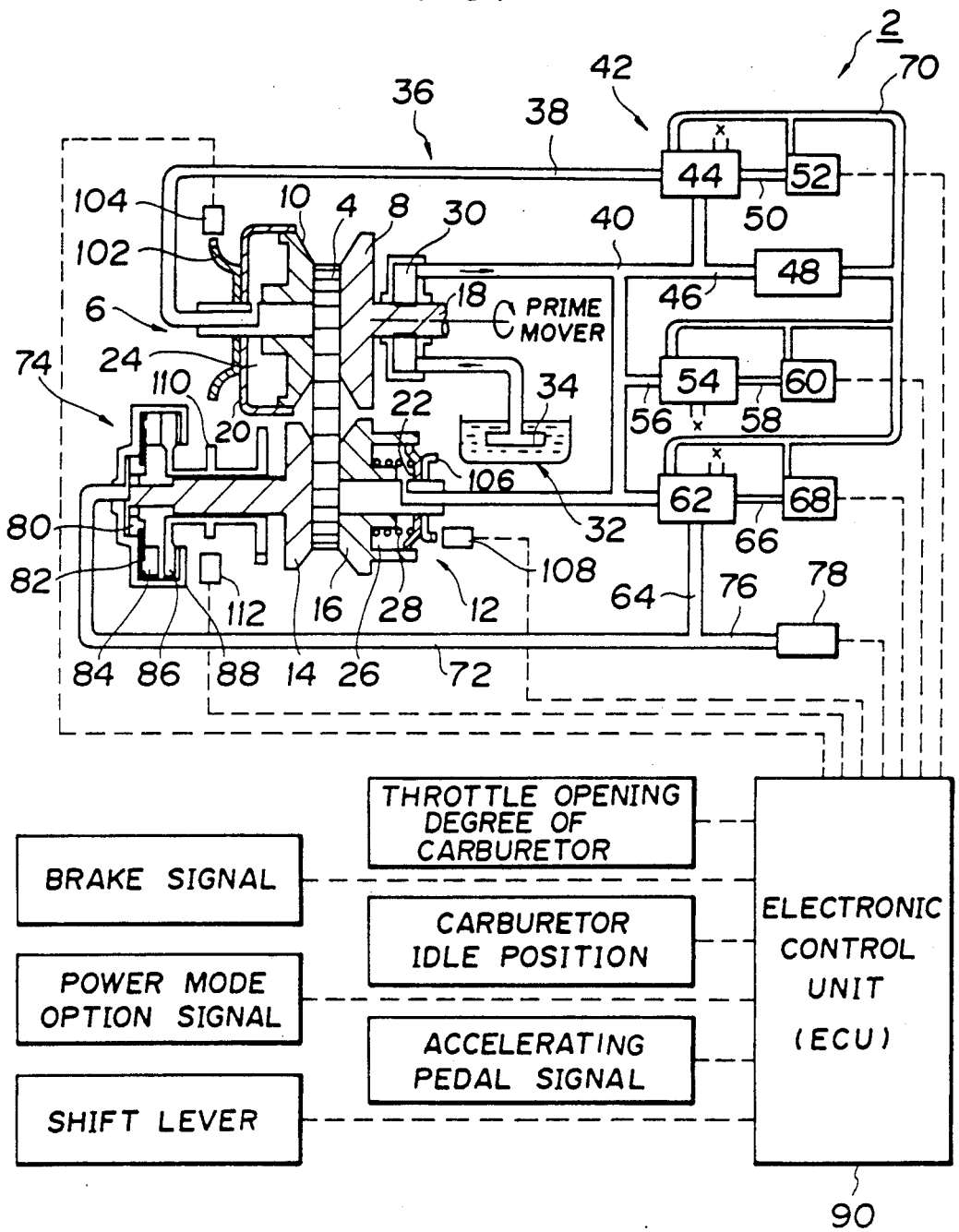
FIG. 1 is a block diagram of a continuously variable transmission which embodies the invention and includes a hydraulic circuit.

The driving side movable pulley piece 10 and the driven side movable pulley piece 12 respectively are cooperable with first and second housings 20 and 22 to thereby form first and second hydraulic chambers 24 and 26, respectively. The driven side second hydraulic chamber 26 has therein a spring 28 adapted to energize the driven side movable pulley 16 so that the pulley 16 is urged toward the driven side fixed pulley 14.

The rotational shaft 18 is connected at one end thereof to an oil pump 30. This oil pump 30 is adapted to feed oil from an oil pan 32 into the first and second hydraulic chambers 24 and 26 via an oil filter 34 and through first and second oil paths 38 and 40 which form a hydraulic circuit 36. The first oil path 38 communicates with a primary pressure, control valve 44 serving as a change speed control valve of pressure control means 42 in order to control a primary pressure as an input shaft sheave pressure. Also, a third oil path 46 communicates with the second oil path 40 at the side of the oil pump 30 with respect to the primary pressure control valve 44 and communicates with a constant pressure control valve 48 for controlling a line pressure (5 to 25 kg/cm²) in general to a constant pressure (for example, 3 to 4 kg/cm²). Furthermore, the primary pressure control valve 44 is continuously in communication with a primary pressure controlling first three-way electromagnetic valve 52 through a fourth oil path 50.

Also, the second oil path 40 is continuously in communication at its midpoint through a fifth oil path 56 with a line pressure control valve 54 serving as an escape valve for controlling a line pressure as a pump pressure. The line pressure control valve 54 is continuously in communication with a line pressure controlling second three-way electromagnetic valve 60 through a sixth oil path 58.

Furthermore, the second oil path 40 communicates on the side of the second hydraulic chamber 26 with a clutch pressure control valve 62 for controlling a clutch pressure through a seventh oil path 64. This clutch control valve 62 is continuously in communication with a clutch pressure controlling third three-way electromagnetic valve 68 through an eighth oil path 66.

Also, the primary pressure control valve 44, the primary pressure controlling first electromagnetic valve 52, the constant pressure control valve 48, the line pressure control valve 54, the line pressure controlling second three-way electromagnetic valve 60, the clutch pressure control valve 62, and the clutch pressure controlling three-way electromagnetic valve 68 each communicate with a ninth oil path 70 controlled by valve 48.

The clutch pressure control valve 62 communicates with a hydraulic clutch 74 through a tenth oil path 72, which communicates with the seventh oil path 64. This tenth oil path 72 communicates at one end with a pressure converter or detector 78 through an eleventh oil path 76. This pressure converter 78 can directly detect hydraulic pressure when a clutch pressure is controlled to be in hold or start modes, etc. The converter 78 has as a function to facilitate bringing the detected hydraulic pressure to a target clutch pressure. Also, when in a drive mode, the clutch pressure is generally equal to the line pressure, and so the pressure converter 78 also contributes to control of the line pressure.

The hydraulic clutch 74 comprises a piston 80, a ring-like spring 82, a first pressure plate 84, a friction plate 86, a second pressure plate 88, etc.

Also, there is provided an electronic control unit (ECU) 90 for performing control of a change of speed in response to various input conditions such as an opening degree of a throttle of a carburetor (not shown) of a vehicle, the engine speed thereof, the pressure detected by detector 78, etc., in particular by varying a duty ratio of control signals in order to control opening and closing of the primary pressure controlling first three-way electromagnetic valve 52, the line pressure controlling second three-way electromagnetic valve 60, and the clutch pressure controlling third three-way electromagnetic valve 68.

Now, there will be described in detail various signals input into the control unit 90, and the function of these input signals.

(1) Signal for indicating the position of a shift lever.

This signal facilitates control of a line pressure, a belt ratio, and a clutch pressure required for various speed ranges according to various range signals representing shift lever positions such as P, R, N, D, L, etc.

(2) Signal for indicating the opening degree of a carburetor throttle.

This signal facilitates an estimate of engine torque from a memory loaded by a program beforehand and facilitates determination of a target belt ratio or a target engine speed.

(3) Signal for indicating the state of a carburetor idle sensor.

This signal improves accuracy in correction and control of a sensor for the opening degree of a throttle of a carburetor.

(4) Signal for indicating the position of an accelerating pedal.

This signal represents a driver's will according to the state of an accelerating pedal the driver has stepped on, and facilitates determining a way of control when a vehicle is running or when a vehicle is starting.

(5) Signal for indicating the state of a brake.

This signal indicates whether a step-down action on a brake pedal has been carried out and facilitates determination of a way of control such as disengagement of a clutch.

(6) Signal for indicating selection of a power mode option.

This signal may optionally be used to facilitate determining the performance of a vehicle either in a sport mode or in an economy mode.

Figure 3:
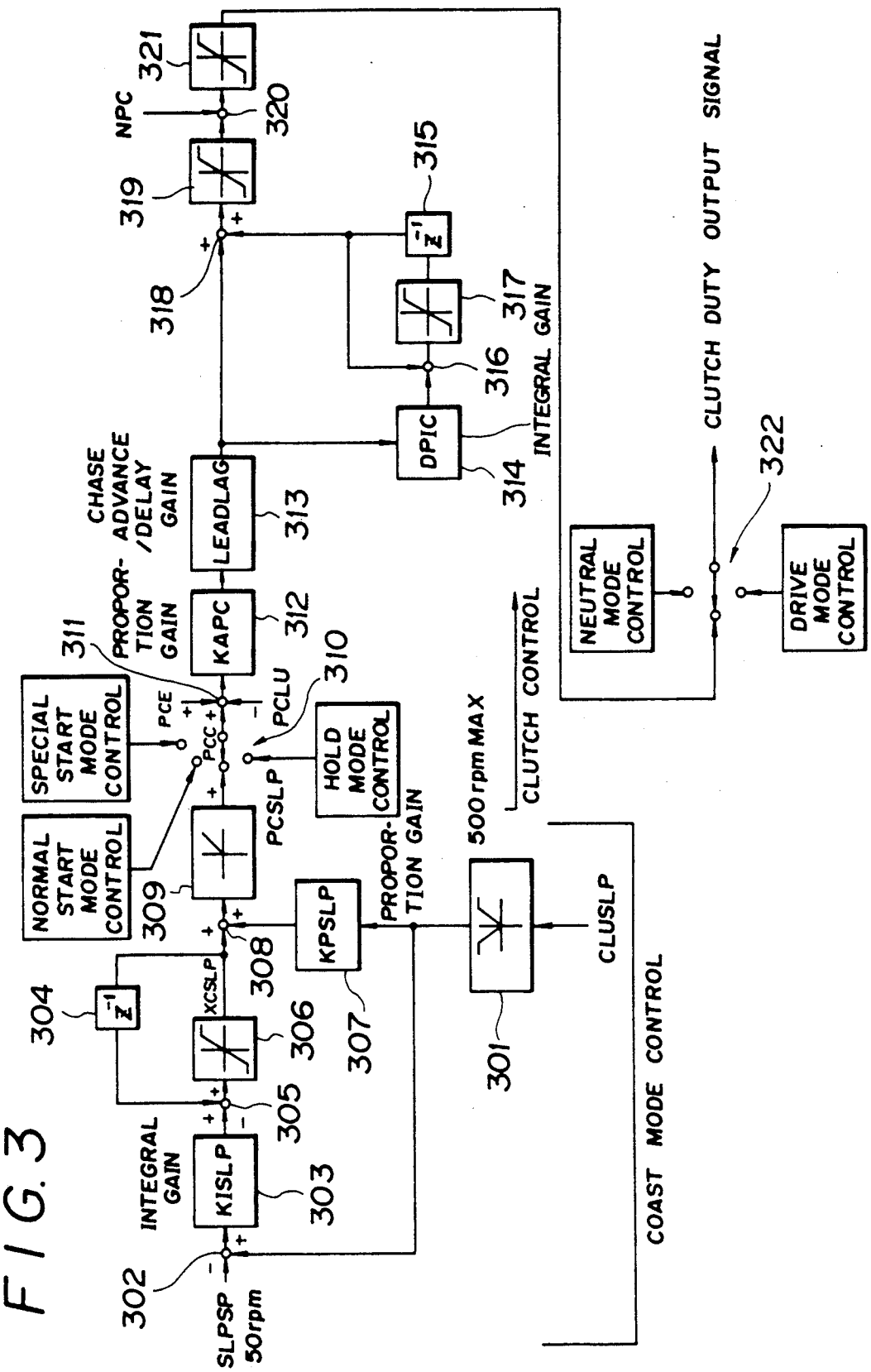
FIG. 3 is a block diagram of a control system which includes coast mode controlling and clutch controlling portions.

The control unit 90 calculates a target clutch pressure from a slip amount of a clutch determined as a rotational difference between an input shaft and output shaft of the hydraulic clutch 74, and effects feed-back control to actuate the various electromagnetic valves in order to maintain this target clutch pressure and thus the slip amount of the clutch. More specifically, as shown in FIG. 3, in a clutch slip mode (hereinafter simply referred to as the "coast" mode) a difference between a current slip amount (CLUSLP) and a target slip rotation (SLPSP, normally 50 rpm) is subjected to integral processing (XCSLP), and the result is added with a product obtained by multiplying a proportional gain (KPSLP) from the clutch slip amount (CLUSLP). As a result, a target value (PCSLP) of the coast mode can be obtained.

A calculating equation for this target value (PCSLP) is shown hereunder:

PCSLP (n+1)|CLUSLP |x

KPSLP+(|CLUSLP|- SLPSP) x

KISLP+XCSLP (n)

where XCSLP(0)=0

That is, in the coast mode, by performing a proportional and integral control with respect to the clutch slip amount, a control for maintaining the clutch slip amount to the target slip rotation is also carried out. In the clutch control, a closed control is carried out under a pressure based on the coast mode target value (PCSLP) like other control modes (see FIG. 3).

Figure 4:
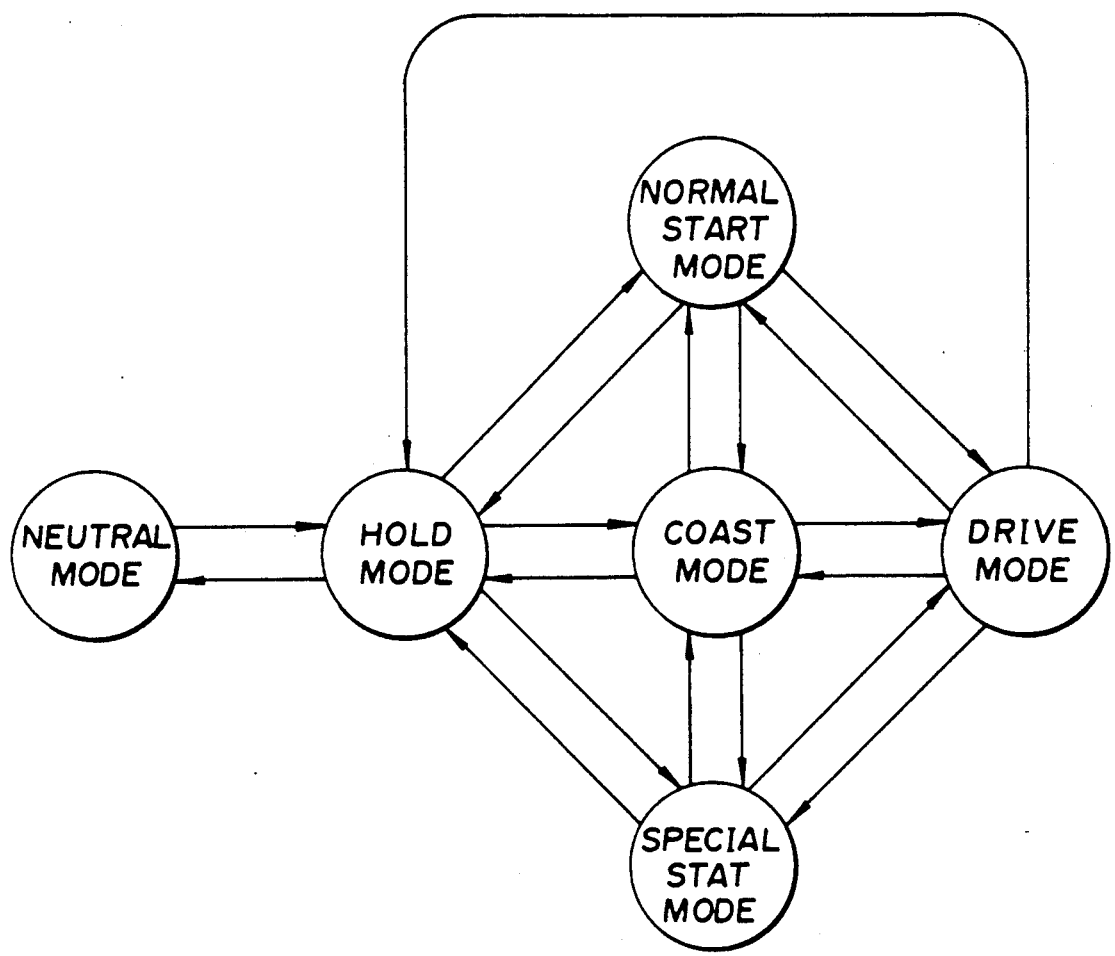
FIG. 4 is a mode diagram showing a relation of a coast mode to other modes.

This coast mode, as shown in the state diagram of FIG. 4, is functionally situated in an intermediate position between the hold mode, the two start modes, and the drive mode. Changes between these control modes, as shown in FIG. 4, are effected as shown by arrows, and changes are not possible between modes which are not connected by an appropriate arrow. For example, although a direct change from neutral mode to hold mode is possible, no direct change from neutral mode to coast mode is possible.

Also, conditions of this coast mode include 5 km/h ≦vehicle speed ≦25 km/h, engine speed >700 rpm, accelerating pedal signal off or on, and opening degree of throttle ≦5%. This means that if the accelerating pedal is pressed further down during a coasting operation at a medium speed or low speed, the system goes from a special start mode to a drive mode, or if a vehicle speed is lowered, it goes to a normal start mode and a hold mode.

On the other hand, in the coast mode, the slip amount of a clutch is about 50 rpm and the hydraulic clutch 74 is in synchronism although it is not completely connected.

Also, as shown in FIG. 1, an input shaft rotation detecting gear 102 is disposed outside the first housing 20 and an input shaft side first rotation detector 104 is disposed in the vicinity of an outer peripheral portion of this input shaft rotation detecting gear 102. Also, an output shaft rotation detecting gear 106 is disposed outside the second housing 22 and an output side second rotation detector 108 is disposed in the vicinity of an outer peripheral portion of this output shaft rotation detecting gear 106. Detecting signals from the first and second rotation detectors 104 and 108 are routed to the control unit 90 and utilized for determining an engine speed and a belt ratio.

The hydraulic clutch 74 is provided with an output power transmitting gear 110. A third rotation detector 112 for detecting the rotational speed of a final output shaft is disposed in the vicinity of an outer peripheral portion of this output power transmitting gear 110. That is, the third rotation detector 112 is adapted to detect the rotational speed of a final output shaft which is directly connected with a reduction gear and a differential gear, a driving shaft and a tire, and is thus capable of detecting vehicle speed. Also, the second and the third rotation detectors 108 and 112 make it possible to respectively detect the rotational speeds of the input shaft and output shaft of the hydraulic clutch 74, and are thus capable of detecting a slip amount of the clutch.

The operation of this embodiment will now be described.

In the continuously variable transmission 2 shown in FIG. 1, the oil pump 30 situated on the rotational shaft 18 is driven by rotation of the rotational shaft 18, and oil from the oil pan 32 is drawn through the oil filter 34. A line pressure as a pump pressure is controlled by the line pressure control valve 54. If a leakage amount from this line pressure control valve 54, that is an escape amount of the line pressure control valve 54, is large, the line pressure becomes low. To the contrary, if the leakage amount from this line pressure control valve 54, that is if the escape amount of the line pressure control valve 54, is small, the line pressure be comes high.

The action of the line pressure control valve 54 is controlled by the exclusive second three-way electromagnetic valve 60, and the line pressure control valve 54 is activated following the action of this second three-way electromagnetic valve 60. This second three-way electromagnetic valve 60 is controlled by controlling a duty ratio of a constant frequency signal. That is, a condition that the duty ratio is 0% indicates a state where the second three-way electromagnetic valve 60 is not activated at all and the output side communicates with the atmosphere, thus making the output hydraulic pressure zero. At the other end of the spectrum, a condition that the duty ratio is 100% indicates that the second three-way electromagnetic valve 60 is continuously activated and the output side communicates continuously with the input side, thus making the output pressure the maximum output hydraulic pressure, which is equal to the control pressure. That is, the output hydraulic pressure is variable according to variation of the duty ratio of the signal supplied to the second three-way electromagnetic valve 60. Accordingly, the characteristics of the second three-way electromagnetic valve 60 make it possible to activate the line pressure control valve 54 analogously, and thus the line pressure can be controlled by valve 54 by appropriately varying the duty ratio of the second three-way electromagnetic valve 60. The action of this second three-way electromagnetic valve 60 is controlled by the control unit 90.

The primary pressure for controlling the change of speed is controlled by the primary pressure control valve 44, and this primary pressure control valve 44, similar to the line pressure control valve 54, is controlled in its action by the exclusive first three-way electromagnetic valve 52. This first three-way electromagnetic valve 52 is used to connect the primary pressure at 38 to either the line pressure at 40 or to the atmosphere. That is, the first three-way electromagnetic valve 52 connects the primary pressure to the line pressure in order to shift the gear ratio to a full overdrive state or it connects the primary pressure to the atmosphere in order to shift the gear ratio to a full low state.

The clutch pressure control valve 62 for controlling a clutch pressure effects a connection of line 72 with the line pressure at 40 when the maximum clutch pressure is required and with the atmosphere when the minimum clutch pressure is required. This clutch pressure control valve 62, similar to the line pressure control valve 54 and primary pressure control valve 44, is controlled by the action of the exclusive third three-way electromagnetic valve 68. Therefore, a repeated description of this control will be omitted here. The clutch pressure varies in a range from the lowest or zero value (atmosphere) to the highest value (line pressure).

The approach for controlling the clutch pressure has six modes, as shown in FIG. 5.

(1) Neutral Mode

When the shift position is N or P and the hydraulic clutch is completely disconnected, the clutch pressure is the lowest (zero) and the hydraulic clutch is off.

(2) Hold Mode

When the shift position is D or R and the throttle is off because the driver has no will for driving the vehicle, or in the case where the driver wants to reduce the vehicle speed and cuts off the engine torque during his driving operation, the clutch pressure is low but sufficient so that the clutch would be contacted, and in particular the clutch pressure is 3.5 to 4.0 kg/cm$^2$ and the clutch is in a half-clutch state (creep state).

(3) Normal Mode

The clutch pressure is 5.0 to 15 kg/cm$^2$ and an engine torque is transmitted to the wheel.

(4) Special Start Mode

The clutch pressure is 5.0 to 15 kg/cm$^2$ and an engine torque is transmitted to the wheel.

(5) Coast Mode

The condition of clutch slip amount being about 50 rpm is satisfied and the clutch input shaft and output shaft are synchronized in rotation with respect to each other.

(6) Drive Mode

For a complete traveling state the clutch is completely engaged (clutch locked-up state), or else after it goes from the start mode to the traveling mode the clutch is almost locked up and the clutch pressure is in a sufficiently high level for bearing the engine torque.

The neutral mode (1) of this pattern is carried out by an exclusive switch valve (not shown) interlocked with the shifting operation. The other modes (2), (3), (4), (5), and (6) are carried out by appropriate controlling duty ratios of control signals which are for the first, second, and third three-way electromagnetic valves 52, 60 and 68 and which are generated by the control unit 90. Particularly, when in the drive mode (6), the seventh oil path 64 and the tenth oil path 72 are in communication with the second oil path 40 through the clutch pressure control valve 62, thus bringing about a maximum pressure generating state. The clutch pressure and the line pressure become the same.

The primary pressure control valve 44, the line pressure control valve 54, and the clutch pressure control valve 62 respectively are controlled by output hydraulic pressure from the first, second and third three-way electromagnetic valves 52, 60 and 68. The control hydraulic pressure for controlling the first, second and third three-way electromagnetic valves 52, 60 and 68 is a constant hydraulic pressure regulated by the constant pressure control valve 48. This control hydraulic pressure is always lower than the line pressure, and it is a stable constant pressure. The control hydraulic pressure is also introduced into the various control valves 44, 54 and 62 in order to stabilize these control valves 44, 54 and 62.

Electronic control of the continuously variable transmission 2 will be described next.

The continuously variable transmission 2 is hydraulically controlled, but the proper line pressure for holding the belt and transmitting the torque, the primary pressure for changing the gear ratio, and the clutch pressure for effectively engaging the hydraulic clutch 74 are controlled according to control signals from the control unit 90.

Figure 2:
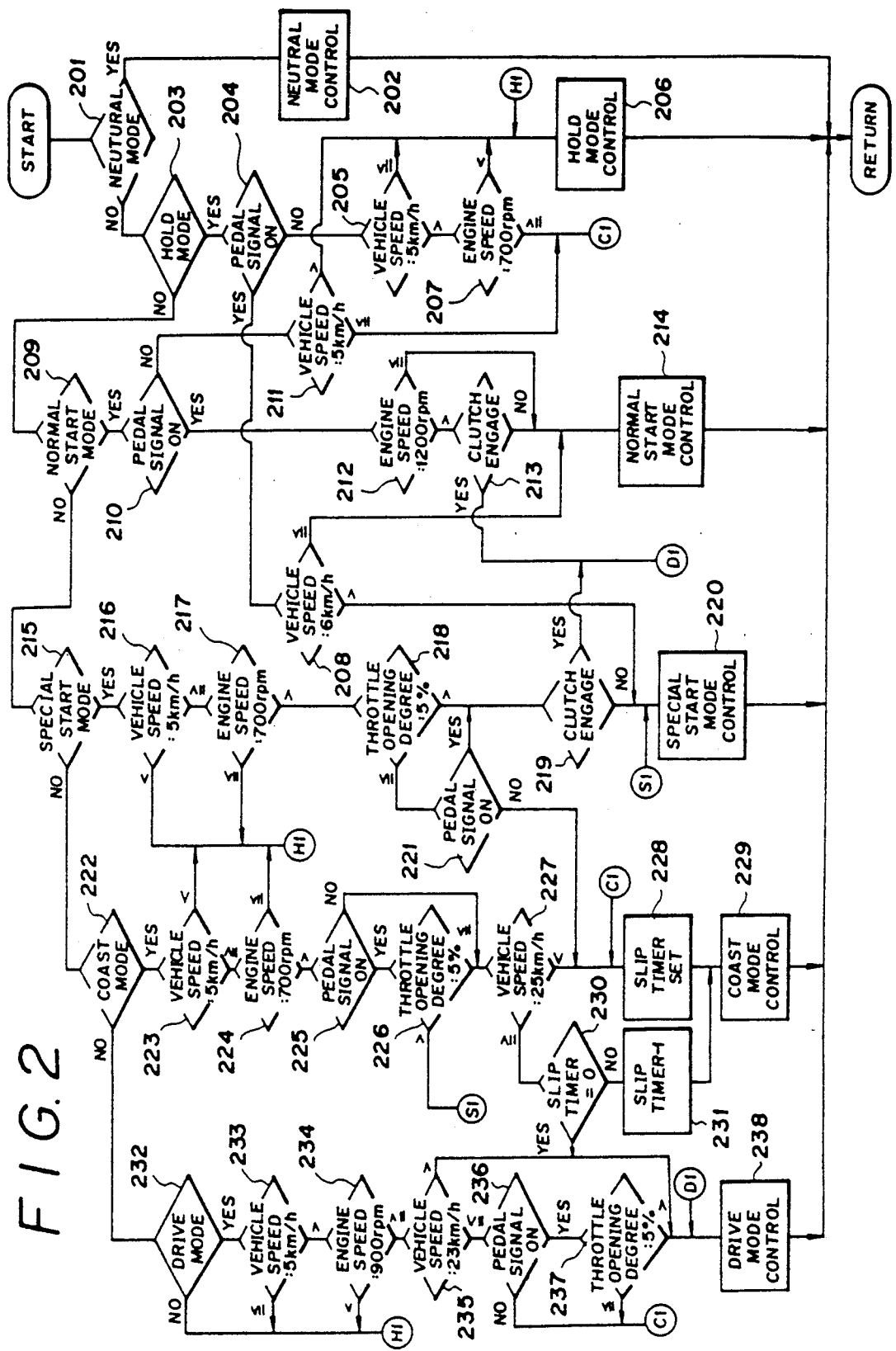
FIG. 2 is a flowchart showing the operation of the embodiment of FIG. 1.

A control mode of a clutch pressure of the hydraulic clutch 74 will be described with reference to the flow-chart of FIG. 2.

When the program starts, it is judged whether or not it is a neutral mode first (step 201).

If it is a neutral mode and is therefore judged as YES in step 201, a neutral mode controlling is carried out in step 202. In this case, the clutch pressure to the hydraulic clutch 74 is 0 kg/cm$^2$.

On the other hand, in step 201, in the case that it is in a mode other than the neutral mode, it goes to step 203.

In this step 203, it is judged whether or not it is a hold mode. If it is the hold mode and is therefore judged as YES in step 203, it is then judged whether or not the accelerating pedal signal for detecting the accelerating operation is on in step 204.

In the case that the accelerating pedal signal is off and it is therefore judged as NO in step 204, it is then judged in step 205 whether the vehicle speed is 5 km/h or less or is more than 5 km/h. In the case that it is judged as vehicle speed ≦5 km/h in this step 205, the hold mode controlling is carried out in step 206. On the other hand, in the case that it is judged as vehicle speed >5 km/h in step 205, it is then judged in step 207 whether the engine speed is less than 700 rpm, or 700 rpm or more.

In this step 207, in the case that it is judged as engine speed <700 rpm, the hold mode controlling is carried out in the preceding step 206. On the other hand, in the case that it is judged as engine speed ≧ 700 rpm in step 207, then it goes to step 228 and, as will be described, a slip timer setting is carried out.

In the above-mentioned step 204, in the case that it is judged as the accelerating pedal signal being on and therefor YES, it is then judged in step 208 whether the vehicle speed is 6 km/h or less or is more than 6 km/h.

In this step 28, in the case that it is judged as vehicle speed <6 km/h, then it goes to step 214 and, as will be described, a normal start mode controlling is carried out. On the other hand, in the case that it is judged as vehicle speed ≧6 km/h in step 208, then it goes to step 220 and, as will be described, a special start mode controlling is carried out.

On the other hand, in the case that it is in a mode other than the hold mode in above-mentioned step 203, it is then judged in step 209 whether it is a normal start mode.

In the case that it is judged as a normal start mode and therefore YES in this step 209, it is then judged whether the accelerating pedal signal is on in step 210. In the case that the accelerating pedal signal is judged as off and therefore NO in step 210, it is then judged in step 211 whether the vehicle speed is 5 km/h or less or is more than 5 km/h. In the case that it is judged as vehicle speed >5 km/h in this step 211, the hold mode control is carried out in the above-mentioned step 206. On the other hand, in the case that it is judged as vehicle speed ≦5 km/h in step 211, a slip timer setting is carried out in step 228 as will be described.

In the case that the accelerating pedal signal is on and therefore YES in the above-mentioned step 210, it is then judged in step 212 whether the engine speed is 1200 rpm or less or is more than 1200 rpm. In the case that it is judged as engine speed >1200 rpm in this step 212, it is then judged whether the clutch is engaged in step 213.

In the case that the clutch is not engaged and NO in this step 213, a normal start mode controlling is carried out in step 214.

On the other hand, in the case that it is judged as engine speed ≦1200 rpm in the above-mentioned step 212, a normal start mode controlling is carried out in step 214. Also, in the case that the clutch is engaged and YES in step 213, it goes to step 238 and, as will be described, a drive mode controlling is carried out.

In the case that it is a mode other than the normal start mode and therefore NO in the above-mentioned step 209, it is then judged in step 215 whether it is a special start mode.

In the case that it is judged as a special start mode and therefore YES in this step 215, it is then judged whether in step 216 the vehicle speed is less than 5 km/h, or 5 km/h or more.

In the case that it is judged as vehicle speed ≧5 km/h in this step 216, it is then judged in step 217 whether the engine speed is 700 rpm or less or is more than 700 rpm. In the case that it is judged as engine speed >700 rpm in step 217, it is then judged in step 218 whether the throttle opening degree is 5% or less or is more than 5%.

On the other hand, in the case that it is judged as vehicle speed <5 km/h in the above-mentioned step 216 or as engine speed ≦700 rpm in the above-mentioned step 217, then it goes to the above-mentioned step 206 and a hold mode controlling is carried out.

In the case that it is judged as throttle opening degree >5% in the above-mentioned step 218, it is then judged whether or not the clutch is engaged in step 219. In the case that the clutch is engaged and therefore YES in this step 219, then it goes to step 238 and, as will be described, a drive mode control is carried out. In the case that the clutch is not engaged and therefore NO in step 219, then a special start mode controlling is carried out in step 220.

On the other hand, in the case that it is judged as throttle opening degree ≦5% in the above-mentioned step 218, it is then judged in step 221 whether the accelerating pedal signal is on. In the case that the accelerating pedal is on and therefore YES in this step 221, it is then judged whether or not the clutch is engaged in the above-mentioned step 219. On the other hand, in the case that the accelerating pedal signal is off and therefore NO in step 221, then it goes to step 228 and, as will be described, a slip timer setting is carried out.

In the case that it is a mode other than the special start mode and therefore NO in above-mentioned step 215, it is then judged whether or not it is a coast mode in step 222. In the case that it is a coast mode and therefore YES in this step 222, it is then judged whether or not the vehicle speed is less than 5 km/h, or 5 km/h or more in step 223. In the case that it is judged as vehicle speed ≧5 km/h in this step 223, it is then judged in step 224 whether the engine speed is 700 rpm or less or is more than 700 rpm.

In the case that it is judged as vehicle speed <5 km/h in the above-mentioned step 223 or as engine speed ≦700 rpm in the above-mentioned step 224, then a hold mode controlling is carried out in the above-mentioned step 206.

In the case that it is judged as engine speed >700 rpm in the above-mentioned step 224, it is then judged in step 225 whether the accelerating pedal signal is on. In the case that the accelerating pedal signal is on and therefore YES in step 225, it is then judged in step 226 whether the throttle opening degree is 5% or less or is more than 5%. In the case that the accelerating pedal signal is off and therefore NO in step 225, then it goes to step 227.

In the case that it is judged as throttle opening degree >5% in step 226, then a special start mode controlling is carried out in the above-mentioned step 220.

In the case that it is judged as throttle opening degree ≦5% in step 226, it is then judged in step 227 whether the vehicle speed is less than 25 km/h, or is 25 km/h or more.

In the case that it is judged as vehicle speed <25 km/h in this step 227, then a slip timer setting is carried out in step 228 and a coast mode controlling is carried out in step 229. In the case that it is judged as vehicle speed ≧25 km/h in the above-mentioned step 227, it is then judged whether or not the slip timer is zero in step 230.

In the case that the slip timer is zero and therefore YES in this step 230, then a drive mode controlling is carried out in step 238, as will be described.

On the other hand, in the case that the slip timer is not zero and therefore NO in step 230, then the slip timer is decremented in step 231 and a coast mode controlling is carried out in step 229.

This coast mode controlling is carried out in the manner shown in FIG. 3. That is, in the coast mode, a target slip rotation (SLPSP: normally 50 rpm) is compared (302) with a current or actual clutch slip amount (CLUSLP) determined using a first table (301). The thus obtained difference is multiplied (303) by an integral gain (KISLP), the result is added (305) with a previous value $Z^{-1}$ (304) of a value XCSLP, and the result is then processed (306) to obtain an integral value (XCSLP). This integral value (XCSLP) is added (308) with a product (307) obtained by multiplying a proportional gain (KPSLP) with the clutch slip amount (CLUSLP). Then, a target value (PCSLP) of the coast mode is found using a second table (309).

That is, $PCSLP(n+1) = |CLUSLP| \times KPSLP +$ $(|CLUSLP| - SLPSP) \times KISLP + XCSLP(n)$ wherein XCSLP (O)=0.

In this coast mode, by performing a proportional and integral control with respect to the clutch slip amount (CLUSLP), a feed-back controlling is carried out in order to maintain the clutch slip amount at a target clutch slip rotation, that is, at a target clutch slip amount (SLPSP).

In the clutch controlling after the coast mode controlling, a close controlling is carried out under pressure, like other control mode, with reference to such calculated coast mode target value (PCSLP). That is, in the above-mentioned controlling, one of the normal start mode control, special start mode control, coast mode control and hold mode control is selected in a first switch portion (310), a target value (Pcc) of a creep (half-clutched state) is found, then a clutch engage pressure (PCE) and a clutch pressure (PCLU) are compared (311) with each other, then such obtained difference is multiplied (312) by a proportional gain (KAPC), and then such proportional gain value is multiplied (313) by an advance/delay gain (LEADLAG).

Then, the result is multiplied (314) by an integral gain (DPIC) and the resulting value is added (316) with a previous upper/lower limit processed value $Z^{-1}$ (315) and then upper and lower limit processed (317).

Thereafter, such advance/delay gained value from 313 is added (318) with such upper and lower limit processed (317) and integral gained value, the result being upper and lower limit processed (319), then the value from 319 and a clutch solenoid duty value (NPC) are added (320) with each other, and then the result is further upper and lower limit processed (321).

In a second switch portion (322), one of the integral value from 321, the neutral mode control and the drive mode control is selected, and a signal of a clutch duty value is output.

On the other hand, referring again to FIG. 2, in the case that it is a mode other than the coast mode and therefore NO in the above-mentioned step 222, it is then judged in step 232 whether it is the drive mode.

In the case that it is the drive mode and therefore YES in step 232, it is then judged in step 233 whether the vehicle speed is 5 km/h or less or is more than 5 km/h. In the case that it is judged as vehicle speed >5 km/h in this step 233, it is then judged in step 234 whether the engine speed is less than 900 rpm, or is 900 rpm or more in step 234.

In the case that it is other than a drive mode and therefore NO in the above-mentioned step 232, that it is judged as vehicle speed ≦5 km/h in the above-mentioned step 233, or that it is judged as engine speed <900 rpm in the above-mentioned step 234, then a hold mode controlling is carried out in the above-mentioned step 206.

In the case that it is judged as engine speed ≧900 rpm in the above-mentioned step 234, it is then judged in step 235 whether the vehicle speed is 23 km/h or less or is more than 23 km/h. In the case that it is judged as vehicle speed >23 km/h in this step 235, then it goes to step 238 as will be described and a drive mode controlling is carried out.

In the case that it is judged as vehicle speed ≦23 km/h in the above-mentioned step 235, it is then judged whether the accelerating pedal signal is on in step 236. In the case that the accelerating pedal signal is on and therefore YES in this step 236, it is then judged in step 237 whether the throttle opening degree is 5% or less or is more than 5%.

In the case that the accelerating pedal signal is off and therefore NO in the above-mentioned step 236 or that it is judged as throttle opening degree ≦5% in the above-mentioned step 237, then a slip timer setting is carried out in the above-mentioned step 228.

In the case that it is judged as throttle opening degree >5 in the above-mentioned step 237, then a drive mode controlling is carried out in step 238.

As a result, when the accelerating pedal is stepped on to open the throttle valve during a coasting operation at a medium or low speed, it is shifted from a special start mode to a drive mode, or if the vehicle speed is lowered, it is shifted to a normal start mode or a hold mode. Therefore, in the coast mode, the clutch slip amount is about 50 rpm and the hydraulic clutch is in a synchronous state even if it is not completely engaged.

By this, during the coasting operation at a medium and low speed, the workability of the engine braking can be improved. Furthermore, during a coast mode, even when the throttle valve is greatly opened to generate an engine torque, the clutch control is rapidly shifted to an engine rotation controlling. Therefore, responsiveness of an engine rotation is not jeopardized, an accelerating performance is enhanced, and in particular the generation of shocks, etc. can be reduced when the vehicle is accelerated from its reduced speed or a very low speed running.

Also, as no radical on or off of the hydraulic clutch occurs when shifting from the coast mode to another control mode, the state of the hydraulic clutch 74 is not radically changed. Therefore, no shocks, etc. are generated and a satisfactory drive feeling can be obtained.

Furthermore, the conventional clutch control system can be modified by adding a feed-back loop according to a clutch slip amount of the hydraulic clutch 74. Accordingly, there can be attained an effective clutch pressure controlling. As a practical matter this is very useful indeed.

As apparent from the foregoing detailed description, according to this invention there is provided a control arrangement for calculating a target clutch pressure according to a clutch slip amount of hydraulic clutch and for using feed-back control in order to maintain the clutch slip amount substantially constant at said target clutch pressure. Accordingly, workability of the engine brake during a coasting operation at a medium and low speed can be improved and an acceleration responsiveness in improved when the vehicle is accelerated, thereby improving accelerating performance. Furthermore, when it is shifted from a control mode to another mode, the state of the clutch is not radically changed. Accordingly, no shocks, etc. are generated and a satisfactory drive feeling can be obtained.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus comprising: a transmission which has a progressively engageable clutch and which is operable in a plurality of predetermined operational modes, including a coast mode; and control means for controlling engagement of said clutch, wherein said control means includes means for determining an actual current slip of said clutch, and for determining an adjusted actual slip by taking an absolute value of said actual current slip and by reducing said absolute value to a predetermined maximum slip value when said absolute value exceeds said predetermined maximum slip value; and wherein said control means includes means for effecting feedback control of engagement of said clutch as a function of said adjusted actual slip with respect to a predetermined target slip so as to maintain said actual current slip substantially at said predetermined target slip.

2. An apparatus of claim 1, wherein in said coast mode said means for effecting feedback control periodically calculates a target level of clutch engagement $PCSLP_n$ according to:

$$PCSLP_n = XCSLP_n + KPSLP|CLUSLP|$$

where $$XCSLP_n = SCSLP_{n-1} + KISLP(|CLUSLP_n| - SLPSP)$$

and hwere KPSLP is a proportional gain, KISLP is an integral gain, $|CLUSLP_n|$ is said adjusted actual slip, SLPSP is said predetermined target slip, and $XCSLP_{O=}0$.

3. An apparatus of claim 2, wherein said means for effecting feedback control includes means responsive to $XCSLP_n$ being above a predetermined positive limit value, and responsive to $XCSLP_n$ to being below a predetermined negative limit value for setting $SCSLP_n$ to said predetermined negative limit value.

4. An apparatus of claim 2 wherein said means for effecting feedback control includes means responsive to said target level of clutch engagement $PCSLP_n$ being less than zero for setting $PCSLP_n$ to zero.

5. An apparatus of claim 2, wherein said clutch is fluid pressure actuated; wherein said control means includes means for applying to said clutch a fluid pressure proportional to a duty ratio of a pressure control signal; wherein said control means includes means for determining an actual current clutch fluid pressure $PCLU_n$ and wherein said control means includes means responsive to each said calculation of said target level of clutch engagement $PCSLP_n$ for thereafter calculating a current duty value $CD_n$ according to:

$$CD_n = NPC + IV_1$$

where $IV_1$ is an intermediate value defined by:

$$IV_1 = LEADLAG(KAPC(PCSLP_{n+PCE-PCLUn}))+IV_2$$

where $IV_2$ is an intermediate value defined by:

$$IV_2 = DPIC(LEADLAG(KAPC(PCSLP_{n-1} + PCE - PCLU_{n-1})))$$

where NPC is a clutch duty value, LEADLAG is a phase advance/delay gain, KAPC is a portional gain, PCE is a clutch engage pressure, and DPIC is an integral gain; and said control means further including means for generating said pressure control signal having said duty ratio corresponding to said duty value $CD_n$.

6. An appartaus of claim 5, wherein said control means includes means responsive to said duty value $CD_n$ being above a predetermined positive limit value for setting $CD_n$ to said predetermined positive limit value, and responsive to $CD_n$ being below a predetermined negative limit value for setting $CD_n$ to said negative limit value.

7. An apparatus of claim 5, wherein said control means includes means responsive to said intermediate value $IV_1$ being above a predetermined positive limit value for setting $IV_1$ to said positive limit value, and responsive to $IV_1$ being below a predetermined negative limit value for setting $IV_1$ to said predetermined negative limit value.

8. An apparatus of claim 5, wherein said control means includes means responsive to said intermediate value $IV_2$ being above a predetermined positive limit value for setting $IV_2$ to said positive limit value, and responsive to $IV_2$ being below a predetermined negative limit value for setting $IV_2$ to said predetermined negative limit value.

9. An apparatus of claim 1, including a vehicle having an engine with a throttle, having an accelerator pedal which can be actuated and deactuated, and having said transmission installed therein, said control means including mean for implementing said coast mode when: a speed of said vehicle is above a first predetermined vehicle speed and is below a second predetermined vehicle speed greater than said first predetermined vehicle speed, a speed of said engine is greater than a predetermined engine speed, and one of first and second conditions exists, said first condition existing when said accelerator pedal is deactuated, and said second condition existing when said accelerator pedal is actuated and an opening of said throttle is below a predetermined throttle opening amount.

10. An apparatus of claim 9, wherein said first predetermined vehicle speed is approximately 5 kilometers per hour, wherein said second predetermined vehicle speed is approximately 25 kilometers per hour, wherein said predetermined engine speed is approximately 700 revolutions per minute, and wherein said predetermined throttle opening is approximately five percent.

11. An apparatus of claim 9, wherein said control means includes means for operating said transmission in said coast mode for a predetermined period of time after the vehicle speed exceeds said second predetermined speed while said engine speed remains above said predetermined engine speed and while one of said first and second conditions exists.

* * * * *

UNITED STATES PATENT AND TRADEMARK OFFICE
CERTIFICATE OF CORRECTION

PATENT NO.  : 5,024,310
DATED       : June 18, 1991
INVENTOR(S) : Katsuaki MURANO et al It is certified that error appears in the above-identified patent and that said Letters Patent is hereby corrected as shown below:

Column 13, line 17; replace "$PCSLP_{n = XCSLPn} + KPSLP|CLUSLP|$" with ---$PCSLP_n = XCSLP_n + KPSLP|CLUSLP_n|$---.

Column 13, line 21; replace "$XCSLP_n = SCSLP_{n-1} + KISLP(|CLUSLP_n| - SLPSP)$" with ---$XCSLP_n = XCSLP_{n-1} + KISLP(|CLUSLP_n| - SLPSP)$---.

Column 13, line 23; replace "hwere" with ---where---.

Column 13, line 31; after "value" insert ---for setting $XCSLP_n$ to said predetermined positive limit value---.

Column 13, line 31; after "$XCSLP_n$" delete ---to---.

UNITED STATES PATENT AND TRADEMARK OFFICE
CERTIFICATE OF CORRECTION

PATENT NO. : 5 024 310
DATED : June 18, 1991
INVENTOR(S) : Katsuaki MURANO et al It is certified that error appears in the above-identified patent and that said Letters Patent is hereby corrected as shown below:

Column 13, line 32; replace "$SCSLP_n$" with ---$XCSLP_n$---.

Column 13, line 53; replace "$IV_1 = LEADLAG(KAPC(PCSLP_{n+PCE} - PCLUn)-) + IV_2$" with ---$IV_1 = LEADLAG(KAPC(PCSLP_n + PCE - PCLU_n)) + IV_2$---.

Column 14, line 2; replace "portional" with ---proportional---.

Signed and Sealed this

Third Day of November, 1992

*Attest:*

DOUGLAS B. COMER

*Attesting Officer*     *Acting Commissioner of Patents and Trademarks*